Nov. 22, 1966  F. E. SCHUCKMAN  3,287,027
COMBINATION TOW HITCH AND GRILL GUARD
Filed Oct. 30, 1964  3 Sheets-Sheet 1

INVENTOR.
FLOYD E. SCHUCKMAN
BY
Berman, Davidson & Berman
ATTORNEYS

Nov. 22, 1966 F. E. SCHUCKMAN 3,287,027
COMBINATION TOW HITCH AND GRILL GUARD
Filed Oct. 30, 1964 3 Sheets-Sheet 2
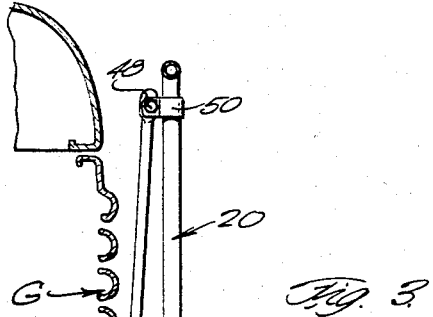
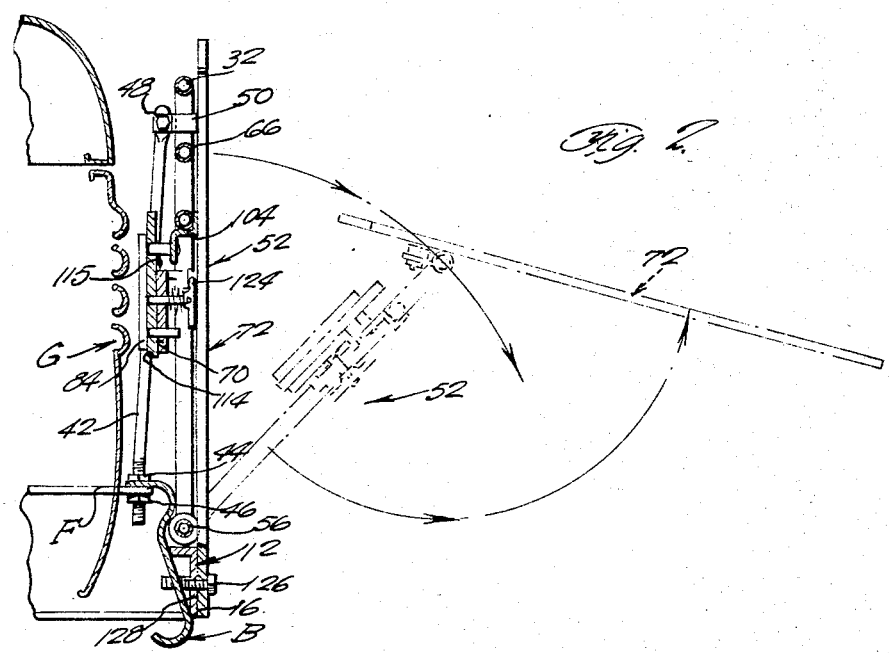
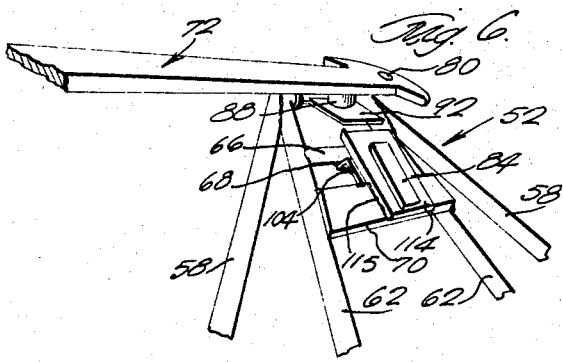
INVENTOR.
FLOYD E SCHUCKMAN
BY Berman, Davidson & Berman
ATTORNEYS

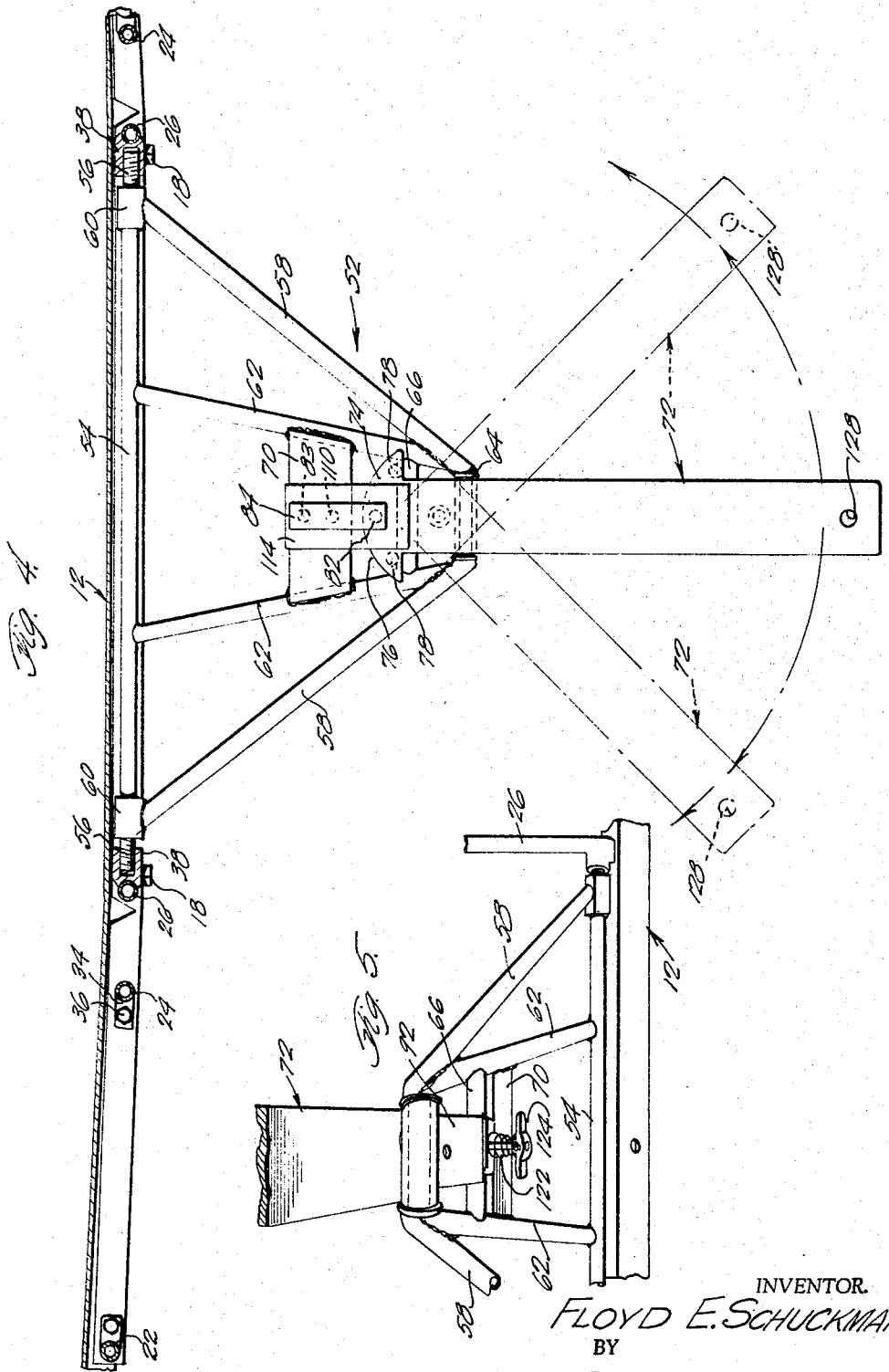

United States Patent Office 3,287,027
Patented Nov. 22, 1966

3,287,027
COMBINATION TOW HITCH AND GRILL GUARD
Floyd E. Schuckman, R.F.D., Arnold, Kans.
Filed Oct. 30, 1964, Ser. No. 407,782
6 Claims. (Cl. 280—491)

This invention relates to a combination tow hitch and grill guard for automobiles.

The primary object of the invention is the provision of an efficient, structurally and mechanically superior combination of the kind indicated, which is designed to be rattle-free, and which has a retractable tow hitch assembly, which, when retracted forms an effective component of the grill guard assembly.

Another object of the invention is the provision of a combination of the character indicated above, wherein the locking of the tow hitch assembly, in retracted position, is provided by a single bolt, and locking thereof in extended position, is produced by a screw and nut binding feature, whereby the extension and retraction and locking of the tow hitch assembly is easy and quiet.

In the drawings:

FIGURE 2 is a fragmentary vertical longitudinal section, showing the drawbar assembly locked in retracted position, in full lines, and in process of being extended, in phantom lines;

FIGURE 3 is a view like FIGURE 2, showing the drawbar assembly secured in extended position;

FIGURE 4 is a horizontal section taken on the line 4—4 of FIGURE 3, showing the drawbar in straight ahead position, in full lines, and in lateral positions, in phantom lines;

FIGURE 5 is a fragmentary front elevation, on an enlarged scale, and partly broken away and in section, showing details of the mounting of the drawbar assembly;

FIGURE 6 is a fragmentary perspective view of the drawbar assembly; and,

FIGURE 7 is an enlarged fragmentary sectional view, like FIGURE 3, showing details of the drawbar assembly and partial disengagement of the coupling plate.

Figure 1:
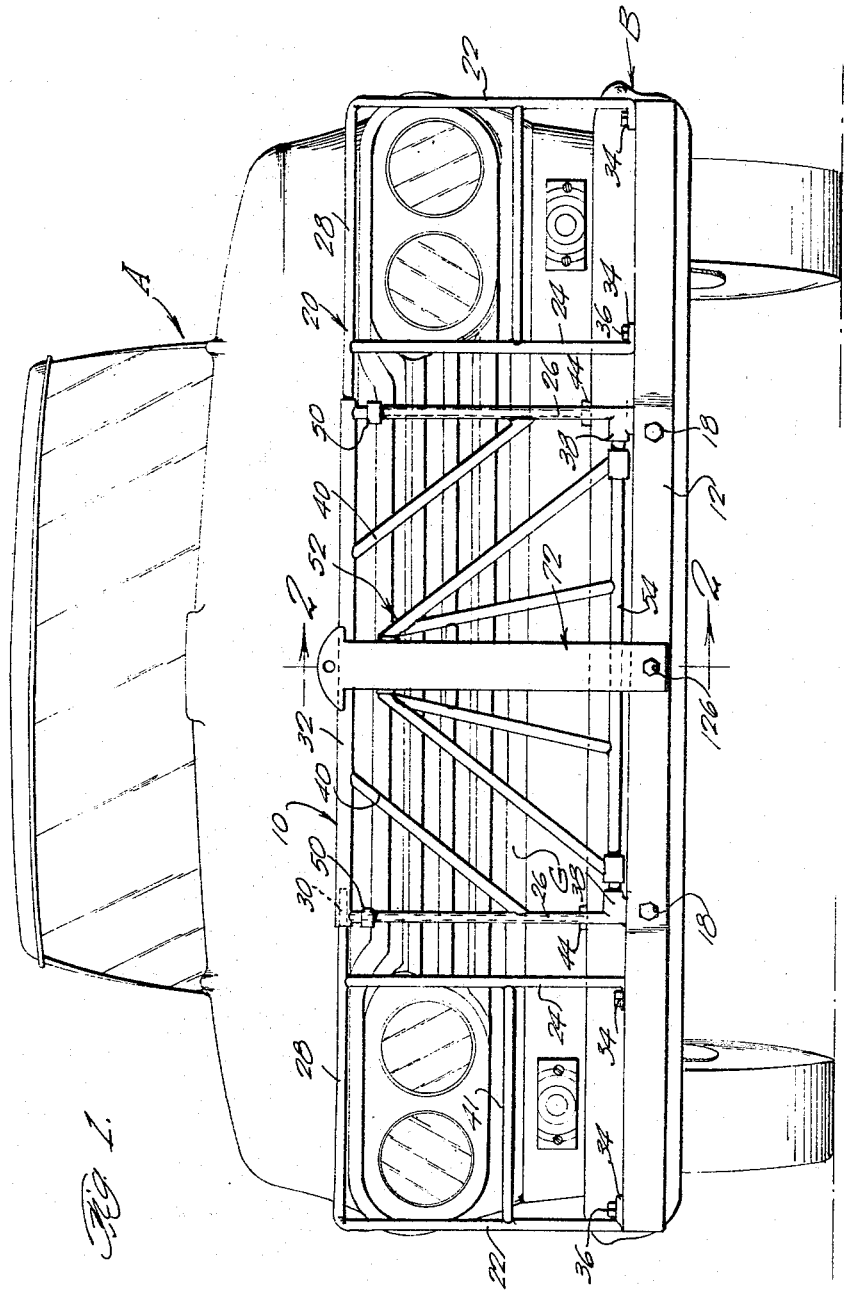
FIGURE 1 is a front end elevation of an automobile, showing a combination of the invention installed thereon, with the drawbar assembly locked in retracted position.

Referring in detail to the drawings, A generally designates an automobile having a front radiator grill G, below and forwardly of which is a front bumper bar B, to which are connected forwardly extending chassis frame members F.

The illustrated combination 10, is mounted upon the front bumper bar B, and is braced to the chassis frame side members F.

The combination 10 comprises a horizontal transverse mounting bar 12, which, as seen in FIGURES 2 and 3, is of inverted L-shaped cross section, and has a rearwardly extending horizontal flange 14 engaged, at its rear edge, with the front surface of the bumper bar B, and a pendant vertical flange 16, which bears, at its lower edge, against the front surface of the bumper bar. The mounting bar 12 extends for substantially the full length of the bumper bar B, and is fixed thereto, at least two points, equally spaced inwardly from the outer ends of the mounting bar 12, by means of screws 18, extending rearwardly through the vertical flange 16, and the bumper bar B, as shown in FIGURE 3.

Mounted upon and upstanding on the horizontal flange 16 of the mounting bar 12 is a grill guard assembly 20, which comprises outer perpendicular standards 22, intermediate perpendicular standards 24, spaced inwardly from the standards 22, and inner perpendicular standards 26, located near to and spaced inwardly from the intermediate standards 24. The standards are preferably tubular and the outer and intermediate standards have fixedly secured, on their upper ends, horizontal tubular outer bars 28, which terminate, at their inner ends, in reduced diameter tips 30, which reach inwardly beyond the intermediate standards 24, and engage in related ends of a single tubular intermediate horizontal bar 32, as indicated in phantom lines, in FIGURE 1. The intermediate bar 32 is fixed upon the upper ends of the inner standards 26.

The outer and intermediate standards 22 and 24 have lateral flanges 34, on their lower ends, which are bolted, as indicated at 36, to the horizontal flange 14 of the mounting bar 12.

The inner standards 26 are suitably fixed, at their lower ends upon the horizontal mounting bar flange 14, and have thereabove, inwardly extending horizontal nuts 38.

The inner standards 26 are braced, relative to the intermediate grill assembly bar 32, by means of diagonal braces 40. Horizontal braces 41, spaced below the top grill assembly bars 28, extend between the outer and intermediate standards. The grill assembly is braced relative to the chassis frame side members F, by means of rearwardly and downwardly angles brace rods 42, which, as shown in FIGURES 2 and 3, extend through upper portions of the bumper bar B, and through the members F, with upper and lower nuts 44 and 46, threaded on the rods 42, against the top of the bumper bar and the endwalls of the members F. At their upper ends, the brace rods 42, are connected, as indicated at 48, to the rear ends of loops 50, which embrace standards of the grill assembly 20.

A tow hitch assembly 52 supported from the nuts 38, comprises a transverse horizontal bar 54, having threaded tips 56, on its ends, which are threaded, as shown in FIGURE 4, into the nuts 38, the threads being arranged so that, when the tow hitch assembly 52 is swung forwardly and downwardly, relative to the grill assembly 20, to extended position, the tips 56 bind on the nuts to form a rattle-free support of the tow hitch assembly.

The tow hitch assembly 52 further comprises outer upwardly converging bars 58, fixed, at their lower ends, as indicated at 60, to the horizontal bar 54, and inner upwardly converging bars 62, fixed, at their lower ends, to the horizontal bar 54, at locations spaced inwardly from the points 60. At their upper ends, the outer and inner bars are fixed together to the ends of an upper cross bar 64. A lower cross bar 66 extends between and is fixed to the inner bars 62 at a location near to and spaced downwardly from the upper cross bar 64. Spaced below the lower crossbar 66, and fixed, at its ends, as indicated at 68, to the inner bars 62, is a transverse anchor plate 70.

A flat, longitudinally elongated drawbar 72 is formed, at its rear end, with a segmental head 74, having an arcuate rear or lower edge 76, and wings 78, which extend beyond the opposite sides of the drawbar. The head 74 is formed with a single central opening 80 adapted to receive an upper lateral pin 82, fixed to a longitudinally elongated coupling plate 84, having a similar lower pin 83, adapted to engage in a hole 86, formed in the anchor plate 70, near the rear edge thereof.

As shown in FIGURE 7, the drawbar 72 is formed with a central lateral boss 88, extending from its front side, near its head 74, which engages in a bore 90, formed through a plate 92, pivoted, as indicated at 93, on and extending downwardly from the upper cross bar 64. The boss 88 terminates in a reduced threaded end 94, which extends through a reduced bore portion 96, on which is threaded a retaining nut 98, which bears against the front side of the plate 92.

A cross member 100 has a front flange 102, fixed to the front side of the lower cross bar 66, a horizontal flange 104, bearing against the cross bar 66, and a rear flange 106, the latter being formed with a hole 108, adapted to receive the pin 82 of the coupling plate 84. The coupling plate 84 is provided with an intermediate, relatively long stud 110, which extends through a hole 112, in a connecting plate 114, welded, as indicated at 115, to plate 70, and a hole 116, in the anchor plate 70. The front pin 82 of the coupling plate 84 engages also through a hole 118, in the connecting plate 114, and the rear pin 83 of the coupling plate engages through a hole 120 in the connecting plate 114.

A coil spring 122 is circumposed on the stud 110 and is compressed between the anchor plate 70, and an enlarged diameter handle 124, fixed on the outer end of the stud, which spring normally serves, as shown in FIGURE 3, to forcibly engage the coupling and connecting plates, the anchor plate 70, and the drawbar 72, with the various pins securely seated in the related holes. Pushing the handle 124, rearwardly against the resistance of the spring 122, acts to unseat the pins 82 and 83, and free the connecting plate, and permit the drawbar 72 to be pivoted, on the axis of the boss 88, to either side of the straight forward portion, as indicated in FIGURE 4, and to be then pivoted downwardly, on the axis of the upper cross bar 64, as indicated in FIGURE 3, as the tow hitch assembly 52 is retracted upwardly and rearwardly against the grill assembly 20.

In the erect retracted position of the tow hitch assembly 52, the drawbar 72 hangs downwardly, in front of the mounting bar 12, and is adapted to be releasably connected thereto, in a rattle-free manner, by means of a bolt 126, which is passed through a hole 128, in the lower end of the drawbar 72, and threaded through the vertical flange 16 of the mounting bar 12, as shown in FIGURE 2.

What is claimed is:

1. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising a mounting bar extending along the front of and fixed to the bumper bar, said end portions being fixed to and extending upwardly from the mounting bar, said end portions comprising laterally spaced standards fixed at their lower ends to the mounting bar, said standards comprising inner standards at the inner ends of said end portions, and horizontal bar means fixed on the upper ends of the standards and extending between the guard end portions, said inner standards having laterally inwardly extending nuts at their lower ends, the tow hitch assembly comprising a horizontal bar having reduced threaded terminals on its ends, said terminals being threaded into the nuts, the threads of the terminals and the nuts being arranged to bind on the depressed and extended position of the tow hitch assembly.

2. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising a mounting bar extending along the front of and fixed to the bumper bar, said end portions being fixed to and extending upwardly from the mounting bar, said tow hitch assembly comprising a horizontal bar pivoted at its ends on the grill guard end portions, outwardly converging bar means fixed to and extending laterally from the horizontal bar, cross bar means extending between and fixed to the converging bar means, a drawbar, means hinging the drawbar at one end on said cross bar means, means pivoting the drawbar on the hinging means to pivot to opposite sides of the converging bar means, and locking means associated with the other end of the drawbar adapted to secure the drawbar to the mounting bar in erect position, in the retracted position of the tow hitch assembly.

3. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising a mounting bar extending along the front of and fixed to the bumper bar, said end portions being fixed to and extending upwardly from the mounting bar, said tow hitch assembly comprising a horizontal bar pivoted at its ends on the grill guard end portions, outwardly converging bar means fixed to and extending laterally from the horizontal bar, cross bar means extending between and fixed to the converging bar means, a drawbar, means hinging the drawbar at one end on said cross bar means, means pivoting the drawbar on the hinging means to pivot to opposite sides of the converging bar means, and locking means associated with the other end of the drawbar adapted to secure the drawbar to the mounting bar in erect position, in the retracted position of the tow hitch assembly, said cross bar means comprising an upper cross bar, a lower cross bar, and an anchor plate spaced below the lower cross bar, the hinging means being journaled on the upper cross bar, a cross member extending between the converging bar means and positioned below and fixed to the lower cross bar, an anchor plate fixed to and extending between the converging bar means and positioned below the cross member, a free connecting plate overlying the rear surfaces of the said one end of the drawbar and said anchor plate, a coupling plate adapted to engage the rear surface of the connecting plate, said coupling plate having forwardly extending upper and lower pins and an intermediate stud, the connecting plate, the said one end of the drawbar and said cross member being formed with aligned holes adapted to receive the upper coupling plate pin, the connecting plate and the anchor plate being formed with aligned holes receiving said stud, the connecting plate and the anchor plate being formed with aligned holes adapted to receive the lower coupling plate pin, and retaining means on the stud adapted to bear against the front surface of the anchor plate.

4. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising a mounting bar extending along the front of and fixed to the bumper bar, said end portions being fixed to and extending upwardly from the mounting bar, said tow hitch assembly comprising a horizontal bar pivoted at its ends on the grill guard end portions, outwardly converging bar means fixed to and extending laterally from the horizontal bar, cross bar means extending between and fixed to the converging bar means, a drawbar, means hinging the drawbar at one end on said cross bar means, means pivoting the drawbar on the hinging means to pivot to opposite sides of the converging bar means, and locking means associated with the other end of the drawbar adapted to secure the drawbar to the mounting bar in erect position, in the retracted position of the tow hitch assembly, said cross bar means comprising an upper cross bar, a lower cross bar, and an anchor plate spaced below the lower cross bar, the hinging means being journaled on the upper cross bar, a cross member extending between the converging bar means and positioned below and fixed to the lower cross bar, an anchor plate fixed to and extending between the converging bar means and positioned below the cross member, a free connecting plate overlying the rear surfaces of the said one end of the drawbar and said anchor plate, a coupling plate adapted to engage the rear surface of the connecting plate, said coupling plate having forwardly extending upper and lower pins and an intermediate stud, the connecting plate the said one end of the drawbar and said cross member being formed with aligned holes adapted to receive the upper coupling plate pin, the connecting plate and the anchor plate being formed with aligned holes receiving said stud, the connecting plate and the anchor plate being formed with aligned holes adapted to receive the lower coupling plate pin, and retaining means on the stud adapted to bear against the front surface of the anchor plate, said retaining means comprising an enlarged diameter handle on the front end of the stud, said handle being spaced from the anchor plate, and a coil spring circumposed on the stud and compressed between the anchor plate and the handle.

5. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising amounting bar extending along the front of and fixed to the bumper bar, said end portions being fixed to and extending upwardly from the mounting bar, said tow hitch assembly comprising a horizontal bar pivoted at its ends on the grill guard end portions, outwardly converging bar means fixed to and extending laterally from the horizontal bar, cross bar means extending between and fixed to the converging bar means, a drawbar, means hinging the drawbar at one end on said cross bar means, means pivoting the drawbar on the hinging means to pivot to opposite sides of the converging bar means, and locking means associated with the other end of the drawbar adapted to secure the drawbar to the mounting bar in erect position, in the retracted position of the tow hitch assembly, said cross bar means comprising an upper cross bar, a lower cross bar, and an anchor plate spaced below the lower cross bar, the hinging means being journaled on the upper cross bar, a cross member extending between the converging bar means and positioned below and fixed to the lower cross bar, an anchor plate fixed to and extending between the converging bar means and positioned below the cross member, a free connecting plate overlying the rear surfaces of the said one end of the drawbar and said anchor plate, a coupling plate adapted to engage the rear surface of the connecting plate, said coupling plate having forwardly extending upper and lower pins and an intermediate stud, the connecting plate, the said one end of the drawbar and said cross member being formed with aligned holes adapted to receive the upper coupling plate pin, the connecting plate and the anchor plate being formed with aligned holes receiving said stud, the connecting plate and the anchor plate being formed with aligned holes adapted to receive the lower coupling plate pin, and retaining means on the stud adapted to bear against the front surface of the anchor plate, said retaining means comprising an enlarged diameter handle on the front end of the stud, said handle being spaced from the anchor plate, and a coil spring circumposed on the stud and compressed between the anchor plate and the handle, the handle being adapted to be pushed against the resistance of the spring to move the coupling plate away from the connecting plate and the drawbar so as to disengage the upper pin of the coupling plate from the hole of the drawbar so as to enable the drawbar to be pivoted to the other side of the anchor plate and to be swung downwardly relative thereto into a pendant erect position, in the erect retracted position of the tow hitch assembly.

6. The combination with an automobile having a front radiator grill, a front bumper bar fixedly supported beneath the grill, of a combination comprising a fixed grill guard assembly fixed to and upstanding on the bumper bar, a tow hitch assembly pivoted on the guard assembly, said tow hitch assembly being adapted to occupy an erect retracted position against the guard assembly and to occupy a horizontal forwardly extending position relative to the guard assembly, said grill guard assembly comprising laterally spaced end portions between which the tow hitch assembly is positioned, said grill guard assembly comprising a mounting bar extending along the front of and fixed to the bumper bar, said end portions being fixed to and extending upwardly from the mounting bar, said tow hitch assembly comprising a horizontal bar pivoted at its ends on the grill guard end portions, outwardly converging bar means fixed to and extending laterally from the horizontal bar, cross bar means extending between and fixed to the converging bar means, a drawbar, means hinging the drawbar at one end on said cross bar means, means pivoting the drawbar on the hinging means to pivot to opposite sides of the converging bar means, and locking means associated with the other end of the drawbar adapted to secure the drawbar to the mounting bar in erect position, in the retracted position of the tow hitch assembly, said cross bar means comprising an upper cross bar, a lower cross bar, and an anchor plate spaced below the lower cross bar, the hinging means being journaled on the upper cross bar, a cross member extending between the converging bar means and positioned below and fixed to the lower cross bar, an anchor plate fixed to and extending between the converging bar means and positioned below the cross member, a free connecting plate overlying the rear surfaces of the said one end of the drawbar and said anchor plate, a coupling plate adapted to engage the rear surface of the connecting plate, said coupling plate having forwardly extending upper and lower pins and an intermediate stud, the connecting plate, the said one end of the drawbar and said cross member being formed with aligned holes adapted to receive the upper coupling plate pin, the connecting plate and the anchor plate being formed with aligned holes receiving said stud, the connecting plate and the anchor plate being formed with aligned holes adapted to receive the lower coupling plate pin, and retaining means on the stud adapted to bear against the front surface of the anchor plate, said retaining means comprising an enlarged diameter handle on the front end of the stud, said handle being spaced from the anchor plate, and a coil spring circumposed on the stud and compressed between the anchor plate and the handle, the handle being adapted to be pushed against the resistance of the spring to move the coupling plate away from the connecting plate and the drawbar so as to disengage the upper pin of the coupling plate from the hole of the drawbar so as to enable the drawbar to be pivoted to the other side of the anchor plate and to be swung downwardly relative thereto into a pendant erect position, in the erect retracted position of the tow hitch assembly, and locking means for locking the lower end of the pendant drawbar to the mounting bar.

References Cited by the Examiner

UNITED STATES PATENTS

| | | | |
|---|---|---|---|
| 2,179,070 | 11/1939 | Weise | 280—491 X |
| 2,572,477 | 10/1951 | Harden | 293—64 X |
| 2,880,016 | 3/1959 | Peterson | 280—491 |
| 2,916,301 | 12/1959 | Cushman | 280—491 |
| 2,918,310 | 12/1959 | Carson | 280—478 |

LEO FRIAGLIA, *Primary Examiner.*